Feb. 2, 1971     D. B. FOSTER     3,560,041

AUTOMOBILE ROAD VEHICLES

Filed Feb. 19, 1968     3 Sheets-Sheet 1

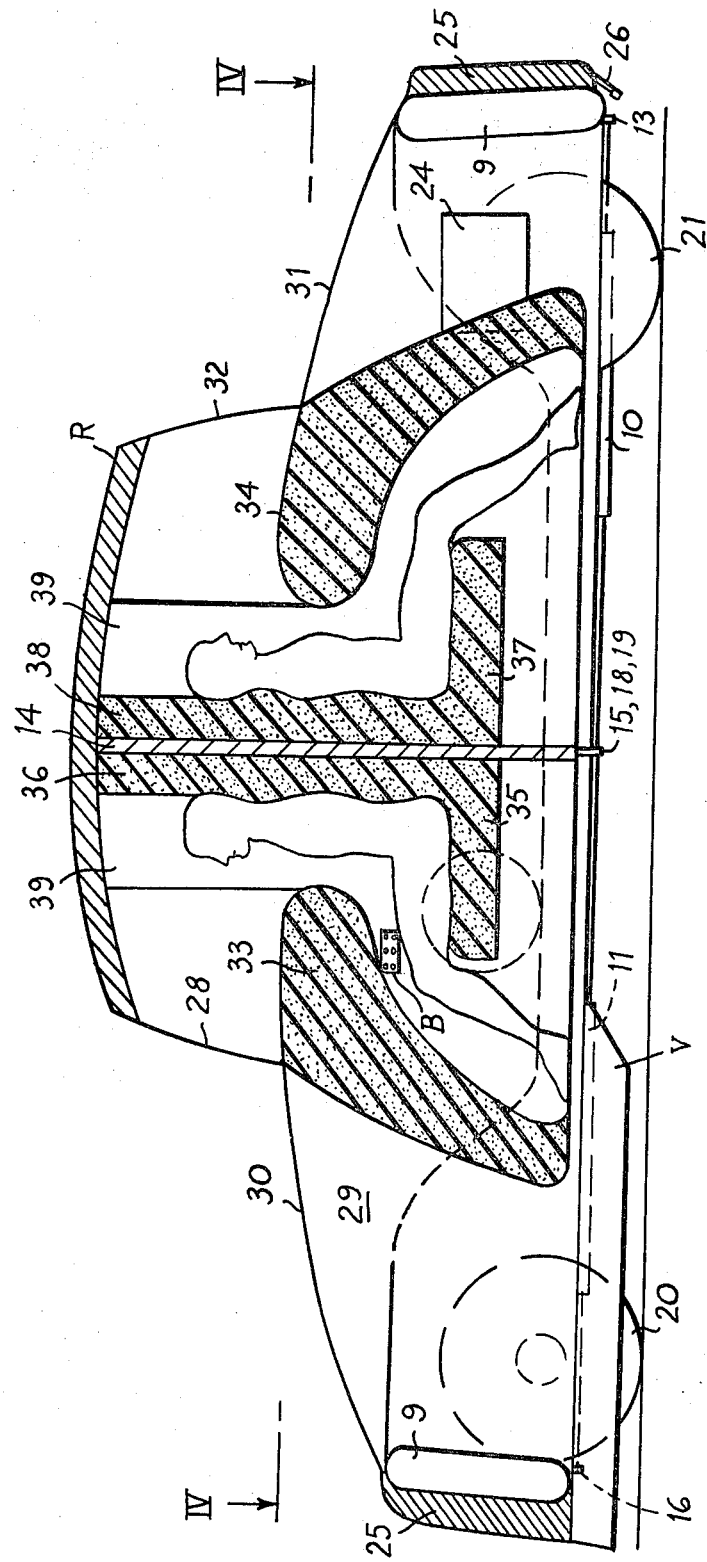

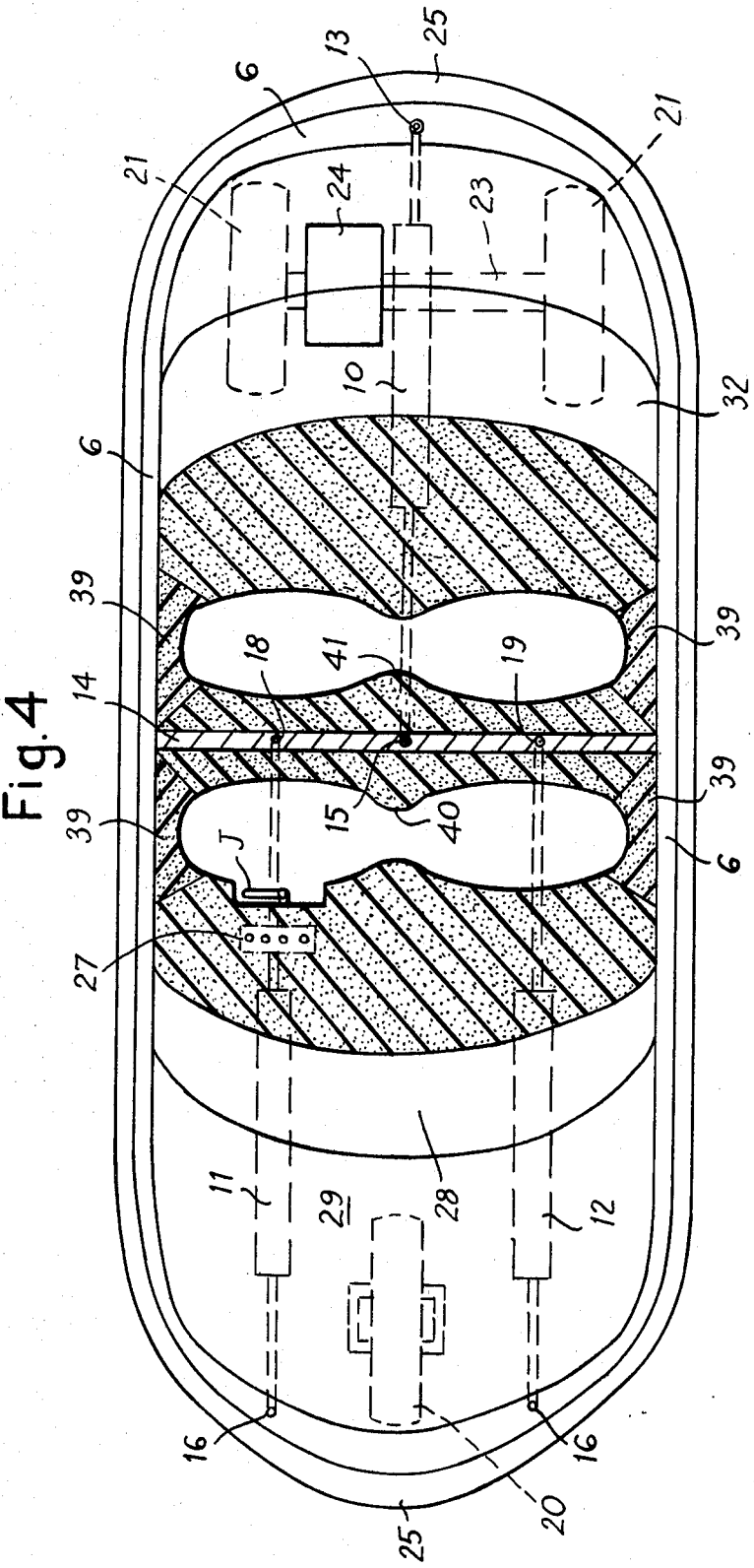

United States Patent Office 3,560,041
Patented Feb. 2, 1971

3,560,041
AUTOMOBILE ROAD VEHICLES
David B. Foster, White House, Sunninghill Road,
Windlesham, Surrey, England
Filed Feb. 19, 1968, Ser. No. 706,335
Claims priority, application Great Britain, Feb. 20, 1967,
8,022/67
Int. Cl. B62d 39/00
U.S. Cl. 296—1          2 Claims

ABSTRACT OF THE DISCLOSURE

A vehicle comprising a mounting chassis, a driver/passenger compartment formed as an assembly separate from said mounting chassis, and shock-absorbing means connected between said mounting chassis and said compartment whereby said compartment can move longitudinally with respect to said mounting chassis. The driver/passenger compartment is provided with interior padding surrounding the occupants from head to feet with the padding being provided with openings therethrough at the locations of the glazed areas of the vehicle body, said padding also being shaped to follow the profile of the seated occupants and to prevent the occupants from coming into contact with the glazed areas in the event of collision.

---

Figure 1:
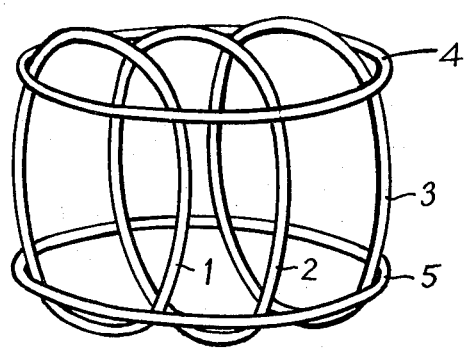

The present invention relates to automobile road vehicles that comprise a mounting chassis, a driver/passenger compartment and motive means for driving the vehicle.

Automobile road vehicles, as conventionally known at this time, are prone to serious damage in the event of a collision, either with another vehicle or with a stationary object. In the event of a collision with a pedestrain, the design and shape of the vehicle usually signifies that the person is easily injured and often, very seriously.

It is an object of the invention so to construct an automobile road vehicle that the possibility of injury to a pedestrian is decreased and, at the same time, where the vehicle collides with another or with a stationary object, it does not suffer such serious damage as has hitherto been usual.

In conventional vehicles, the chassis is generally either part of the bodywork that includes the driver/passenger compartment or, in the alternative, where a separate chassis is initially laid down, the bodywork is securely attached thereto, so as to form a rigid assembly. The road wheels are attached to the chassis and the engine is conventionally mounted under a protective cover separate from the driver/passenger compartment. In order to protect the vehicle against collision, it is normally provided with bumper bars fore-and-aft but these give no protection whatsoever from impact to the side of the vehicle. Moreover, the vehicle, as a whole, has many sharp edges or corners and generally has many protuberances, all of which are extremely dangerous, particularly in a collision with a pedestrian.

The invention consists in an automobile road vehicle in which the driver/passenger compartment is formed as an assembly separate from the mounting chassis and the motive means, and is connected to said mounting chassis through the interposition of shock absorbing means whereby it can move longitudinally with respect thereto.

Preferably, the mounting chassis includes a protective member that completely encircles the compartment, the shock absorbing means being interposed between said protective member, which forms a bumper or fender protecting the compartment from collision shocks from all aspects, and said compartment. The level of this protective member is arranged so that it clears the bottom edges of any doors that may be provided.

Thus, the invention provides a vehicle that effectively packages the driver and passengers in an inner compartment and the vehicle is provided with a distinctly separate all-round girdle bumper or fender as an anti-penetration system with shock-absorbing means provided between the girdle bumper and the inner compartment. Thus, the vehicle occupants are packaged and protected by penetration of harmful objects from the outside on collision. They may also be, and preferably are protected by suitable protective means provided on the interior of the vehicle, from damage either directly due to shock or indirectly due to injury following on shock by being thrown against penetrating or crushing objects forming part of the interior of the vehicle which would be the case in a conventional vehicle.

Insofar as the invention proposes a complete construction of a vehicle, the protection of the vehicle occupants is not in any sense voluntary (as it is in conventional arrangements, where seat belts and other safety devices are provided), and the occupants obtain the protection without any additional action on their part, because the protection is intrinsic in the design of the vehicle.

Advantageously, the possibility of injury to occupants by being thrown against objects inside the vehicle is reduced by maximising the contact area of any objects in the vehicle, so as to decrease any pressure of impact.

It is also proposed that a substantial degree of resilience and shock absorbing cushioning shall be employed on the vehicle so as to protect pedestrains and other road users who may be struck by the vehicle and, similarly, it is also proposed that some or all of the vehicle wheels shall be protected by a valance construction of such formation as to deflect any persons struck, away from the path of the wheels and the vehicle. It is, furthermore, proposed that the shape of the vehicle in plan shall be such as to encourage glancing incidence in the event of a collision which would thus also discourage colliding vehicles from becoming interlocked.

In order that pentration of external objerts on collision shall be prevented, the encircling girdle should be very strong, wherefor it is proposed that it be made from steel but should be many times stronger than that of a conventional car bumper. For this reason, the invention envisages that this gridle bumper shall have a continuous shape, e.g. be ellipsoidal, so that the whole of the girdle contributes to resist penetration by deforming without losing its continuous convex integrity and thus acts rather like an ellipsoidal spring such, for example, as the diametrical section of a rugby ball. Such a construction gives a much greater penetration resistance then can be achieved by beams.

Advantageously, bulkheads are provided in front of and behind the occupants to provide further protection and the shock-absorbing means may be provided between such bulkheads and the girdle bumper, these means consisting either of shock-absorbing mechanisms or resistance-loss material.

It is important that the protective means described above shall be applied to the various parts of the proposed vehicle to the extent at which statistics show that accidents occur and these statistics indicate that the known incidences of damage and injury is as follows:

| | Percent |
|---|---|
| From the front of the vehicle | 65 |
| From the rear of the vehicle | 20 |
| From the side of the vehicle | 15 |

Thus the construction of the vehicle at its side, although in accordance with the principles laid down above, need not be so stringent as at the front and the rear of the vehicle and it is, furthermore, necessary that the girdle bumper shall enable access to be obtained to the compartment through the doors, wherefor the girdle bumper along the sides of the vehicle is at a reduced height compared with the front and the rear but, nevertheless, maintains its continuity completely around the vehicle. It is, moreover, proposed that the doors, where provided, shall be of substantially greater strength than those normally used on conventional vehicles, so as to provide both penetration-resistance and a degree of shock absorption by the use of resistance-loss material.

The packaging of the passengers may be achieved by using a shape for the vehicle that will restrain the motion of the passengers as to horizontal and vertical motion by means of a lap/chest buffer. Furthermore, heavy cushioning materials are preferably provided over all surfaces which the occupants could strike, thus using the principle of maximising contact area in the event of impact. It will, furthermore, be advantageous, so as to limit the effect of backward or forward whiplash of the occupants' heads, to provide a combination of back head-rest and a padded section of the top face of the lap/chest buffer for the forward passengers and arranging for the rear passengers to face the opposite way and be provided with similar means which operate out of phase.

It is, furthermore, desirable that a roll-over bar be provided as part of the seat construction, which is preferably common, and this roll-over bar is integral with the inner compartment zone.

The provision and accommodation of the motive means mechanical controls and styling are all subservient to the requirement for safety.

Figure 2:
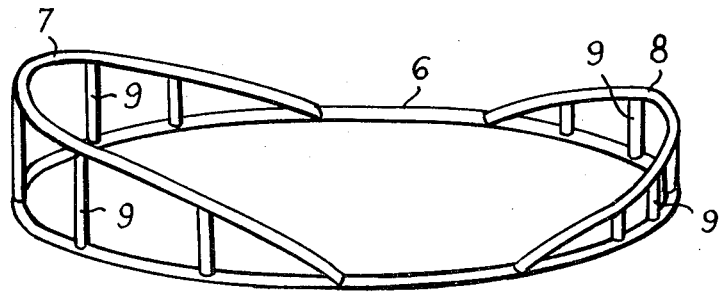

In order that the invention may be more clearly understood, reference will now be made to the accompanying drawings which show some explanatory diagrams and certain schematic embodiments thereof, by way of example, and in which:

FIG. 1 schematically shows a framework used in the construction of the passenger compartment of a vehicle according to the invention, FIG. 2 schematically shows the construction of the basic girdle bumper, FIG. 3 shows a side sectional elevational of a complete vehicle, and FIG. 4 shows a plan view of the vehicle of FIG. 3 taken along the line IV—IV thereof.

Referring now to the drawings, FIG. 1 schematically shows the construction of a framework upon which the driver/passenger compartment, comprising three vertical hoops 1, 2, 3 made from tubular steel, with two horizontal hoops of similar construction 4 and 5 respectively secured, e.g. by welding, to the upper and lower parts of the vertical hoops. FIG. 2 shows schematically the construction of the girdle bumper or fender, comprising a basic hooped shaped member 6 with a forward half-hoop 7 and a rearward half-hoop 8 secured thereto. Interconnecting the half-hoops 7 and 8 and the base hoop 6 is a plurality of vertical tubes 9. The joints between the various members are advantageously made by welding.

The first vertical hoop 1 defines the front transverse plane about the windscreen 28; the second vertical hoop 2 defines the door pillar frame and the vertical hoop 3 defines the rear windscreen plane for the rear windscreen 32.

The construction shown in FIG. 1 is formed into a compartment or cabin by appropriate fixing of external roof, floor and side panels and door thereto and FIG. 3 shows a side elevational section through a completed vehicle where the upper hoop is shown as a support for a roof panel R. This compartment is mounted within the girdle bumper 6-9 by any convenient means in such a manner that it is free to move longitudinally within the shape. Such mounting means are not shown, since they may take any convenient form within the knowledge of present day practice. In additon to these mountings, shock absorbing means are provided between the compartment and girdle bumper, a rear shock absorber is shown at 10 and two forward shocks absorbers at 11 and 12 respectively. All the shock absorber means are arranged to operate in tension so that on a forward impact the rear shock absorber 10 will come into operation but on a rearward impact the forward shock absorbers 11 and 12 will be so used. Over-ride mechanisms of known kinds may be provided to come into operation on the shock absorbers not being used. The rearward end of the shock absorber 10 is secured to the girdle bumper 13 and the front end thereof is secured to a vertical bulkhead 14 of the compartment at 15. The forward ends of the shock absorbers 11 and 12 are secured to the girdle bumper as shown at 16 and 17 respectively, and the rear ends thereof are respectively secured to the bulkhead 14 at 18, 19. Thus, the compartment as a whole is enabled to move longitudinally within the girdle bumper under the action of the shock absorbing means 10, 11 and 12. If desired, the part shock absorbers 11 and 12 may be omitted and in that case, the rear absorber 10 needs no over-ride mechanism.

At all points the girdle bumper presents a convex shape to the outside as a result of which it will distort as a whole if it is struck, but will not buckle. In fact, for safety reasons it should be encouraged to distort and for this reason should be free from any substantial cross ties or beams. This girdle bumper effectively constitutes the major part of the chassis of the vehicle in as much as it is used to support all the motive mechanisms and the wheels.

In the embodiment described, the steering of the vehicle is effected through a single front wheel 20 mounted on any suitable mounting means which per se form no part of the present invention, and the rear of the vehicle is supported by two rear wheels 21 and 22 interconnected by an axle 23: the motive means is shown as a motor 24 which may be of any desired kind and may for example be either an internal combustion engine, or an electric motor suitably powered.

Whilst the girdle bumper essentially comprises a framework of steel or other strong metal of tubular or similar form, it is preferably covered with resistance-loss material such as a rubber or plastics material tyre outer cover which is shown in FIGS. 3 and 4 at 25. If desired, this outer cover may be provided with an inner compartment which is inflatable for example through a nozzle 26, so that the whole cover resembles a tough, truck-type pneumatic tyre. The main feature of the construction is its substantially, total elliptical integrity so that, on being struck at any part in a collision, the whole framework comes into operation to resist the impact and thus to keep the passenger compartment inviolable. If the outer covering of the bumper girdle is inflatable it will be appreciated that this greatly adds to the strength of the construction without appreciable addition of weight. The outer cover has increased dimensions at the front and rear to provide extra fending capacity for frontal and rear collisions, as is shown in the drawing, but it would also be possible for such increased dimensions to be given to the sides to protect the passenger compartment against a lateral collision. It will also be observed that at the front the plan form of the girdle bumper is tapered and blunt nosed to encourage glancing incidence in collision and thus reduce maximum collision retardation of the vehicle.

In one particular construction, the passenger compartment is arranged so that it can move up to about three feet in a forward direction under its own momentum against restraint by the shock absorbers 10, 11 and 12 which are preferably hydraulic in operation. These shock absorbers are designed to have controlled characteristics and preferably they have a higher initial rate followed by a subsequent lower rate. Of course, a reverse arrangement of the shock absorbers to that shown may be employed if desired. Thus, the shock absorbers may operate in compression instead of in tension.

In view of the universal trend towards automatic gear boxes for automobile vehicles, it is preferred that the gear box of the vehicle will be electrically controlled as in current practice. Control of brakes and accelerator which are not illustrated in the drawing so as not to confuse the showing, can use conventional pedals with hydraulic flexible pipes for equivalent transmission means following conventional practice. It is suggested that the conventional position of the steering wheel should be avoided and be replaced by either a vertical wheel between the two front passengers or by a "joy stick" in the same position. If a joy stick is used it could also incorporate the brake and accelerator control functions. In the embodiment, a joy stick J is shown on FIG. 4 of the drawings.

Electrical control for lights, windscreen wipers, etc. can be by a small push button keyboard B located under the right hand of the passenger at just below seat level. Instrumentation e.g. dials for speed indication and so on, can be located, possibly on the vehicle centre line at 27 and be transmitted to the drive either by direct viison or by silvering of the windscreen 28 in that area.

Whilst the vehicle lends itself to rear engine-rear transmission, any other desired layout may be adopted. It is believed however, that the safest place for the engine against collision damage is at the rear of the vehicle, as shown.

Whilst a single steered wheel 20 is shown at the front, it will be appreciated that a two wheel configuration could be used and if a pair of wheels is employed with an interconnecting axle these may be spaced considerably closer together than is conventional so that on full lock the wheels can turn easily within the girdle bumper construction. Alternatively however, there may be two free running front wheels and a steered single rear wheel. Transmission of steering torque from the joy stick J or vertical steering wheel could be by hydraulic servo means.

Luggage may be accommodated in the space at the front of the vehicle at 29 normally reserved for the retardation movement of the passenger compartment. If desired, this luggage accommodation could be combined with a mechanism to lift the floor of that compartment so that baggage is ejected through the bonnet or hood space on impact.

The front and rear panelling 30 and 31 may be of any desired material but preferably a material that is capable of concertinering easily on impact. For example, it could either be light-weight metal or sheet rubber or plastics material.

Within the compartment itself, reference 33 indicates a forward buffer designed from deformable materials so that on collision the front passengers fall into it so that the body bends around the pelvis and almost all the front of the body is thus trapped and cushioned. Thus, as is apparent from FIG. 3, the buffer 33 has an upper part that projects towards the occupants and is above their centre of gravity. This figure also shows that this buffer is shaped to follow the profile of the seated occupants and is spaced not more than 12 inches from them. Since the majority of the body area and weight is from the chest downwards, this causes a turning moment tending to drive the body even further into the lower areas of the buffer. The buffer 33 perferably comprises three laminations of progressive properties and made from a foamed plastics material as follows:

(a) an outer layer designed to soften initial impact particularly on the face and essentially fulfilling a "fall-soft" function. This layer should be of sufficient depth to spread the load from the nose and teeth over a great area and thus equalise forces over the face as a whole. For example, this layer may be about 4 inches thick.

(b) A middle layer having the function of spreading the load over a major area of the body so that there is some equalisation of pressures over perhaps 3 square feet of the body and particularly taking in the legs, pelvis, abdomen, chest, arms, shoulders and head. A further 4 inches or so of somewhat stiffer material appears to be required for this purpose.

(c) The final layer represents a zone where the body has to come to rest relative to the passenger compartment over perhaps a final distance of 6 inches.

The material characteristics of the buffer are those such as to hold and lightly grip a passenger thrown forwardly for at least a few seconds in order to prevent the passengers being further thrown about in the vehicle.

Similar considerations apply to a rear buffer 34, bearing in mind that the rear passengers sit back-to-back in relation to the front passengers in the preferred embodiment illustrated. The front passangers sit on a seat 35 having a back rest 36 and the rear passengers sit on a seat 37 having a back-seat 38. The back-rests 36 and 38 extend right up to the roof of the vehicle, and an aperture (not visible in the drawings) is provided through the back-rests for intercommunication and rear viewing.

It will be appreciated that the shock absorbers probably would come into operation for reducing shock retardation over the above two latter phases (b) and (c). If desired, the buffers 33 and 34 may be zoned as to differential resistance against various parts of the body according to injury susceptability. For example the head, chest and pelvic areas might be graded from the softer to harder materials.

The roof panel R is preferably lined with cushioning material to a suitable depth, e.g. 4 inches.

The separating bulkhead 14 is of stiffened material. Whilst the preferred embodiment shows the passengers as seated back-to-back if desired, a conventional seating arrangement may be employed so that the rear compartment is similar in layout to the forward compartment of the vehicle, as in common practice.

Cushioning against lateral collision is provided by similar buffering techniques by the provision of appropriate padding indicated by the generic reference numeral 39 in FIG. 4: this cushioning, which is of similar material to the buffers 33 and 34, is attached to the doors so that when closed the passengers are packaged all around but opening the doors removes the side cushioning to give entry access. The doors have not specifically been illustrated in this schematic representation of the vehicle, but their location will be inferred from the positioning of the padding 39. These doors are of such height that when opened they avoid the forward and rearward half-hoop 7 and 8 of the girdle bumper.

In order to prevent collision between passengers in the event of an accident, the seats and back-rests may be suitably sculptured as shown at 40 and 41 in the front and rear portions of the compartment respectively. But, since four doors can easily be accommodated in the vehicle, a continuous barrier between passengers may be provided which is suitably padded.

A valance V is preferably provided to protect persons knocked down by the vehicle from further contact by the front wheel or wheels. A similar valance could be provided at the rear end of the vehicle.

The following table gives relevant calculations useful in appreciating the benefits derived from the present invention.

| Speed before impact | | Average retardation over 2 ft. in G's | Force on 150 lb. body | Pressure in 1 lb. sq. in., over 2 sq. ft. | Equivalent water depth in ft. |
| --- | --- | --- | --- | --- | --- |
| M.p.h. | Ft./sec. | | | | |
| 10 | 14.7 | 1.69 | [1] 254 | .88 | 1.76 |
| 20 | 29.3 | 6.7 | 1,000 | 3.48 | 7 |
| 30 | 44 | 15.1 | 2,160 | 7.50 | 15 |
| 40 | 58½ | 26.7 | 4,000 | 13.9 | 27.8 |
| 50 | 73 | 41.6 | 6,200 | 21.5 | 43 |

[1] Pounds.

Referring to the above table, column 1 shows the velocity of a vehicle before head-on impact with an immovable object, such as a concrete block and is shown in m.p.h.: the second column also indicates velocity but in f.p.s. The figures in the third column assume that the thickness of about 2 feet of shock-absorbing motion referred to hereinabove operates on a uniform retardation basis over this distance, and is calculated according to the formula $$r = v^2/2 \text{ g's}$$

where $v$ is the initial velocity in f./sec., $g$ is the gravitational constant of 32 feet./sec.$^2$ and $s$ is the retardation distance of two feet. The fourth column shows the force produced on a human body of 150 lbs. weight when stopped at the retardation $r$ and according to the equation $F=Wr$, where W is the weight of 150 lbs. and $r$ is the retardation in gravitational constants or G's. The fifth column shows the pressure produced on the body assuming that the retardation is taken over a body area of 2 sq. ft. which is considered to be a reasonable figure and, according to the formula $p=F/a$, where $a$ is the area in sq. inches corresponding to 2 sq. feet.

The sixth column is for general comparison of the unit body pressure produced on an under-water diver according to the formula $D=2p$ where D is the depth in fact and $p$ is the pressure in lbs. per sq. inch.

From the above table it will thus be seen that even at the speed of 50 m.p.h. the pressure produced on the retarding body is only the same as immersion under 43 feet of water, a pressure that the body can easily stand without damage. This shows that the function of the padding in the vehicle at the lap/chest counter is crucial, not for reducing the retardation rate, since its thickness of some three or six inches is negligible compared with the two feet of the main shock-absorbing system, but in spreading the total retardation force over a greater area and thus reducing the unit pressure on the body.

Thus the system is far superior to a seat-belt restraining arrangement where typical retardation areas on a lap and strap system of 2" width is only of the order of .66 sq. feet and thus the pressures developed are some three times higher than with the system of this invention. Furthermore, by careful study of body contours and the moulding of the lap/chest buffer shape it is considered that an effective body retardation area of some three square feet can be accomplished related to the chest, abdomen, pelvis, thighs, lower legs and arms.

Whilst the system as described can be applied to a vehicle having conventional engines, preferably mounted at the rear of the vehicle, and other appropriate mechanical means, nevertheless, in a preferred embodiment of the invention the motive power is provided by electrical motors, one on each wheel, so as to exploit the full possibilities of the system without any complications arising due to the considerations of mechanical driving requirements. Individual driving control of each wheel would clearly give more precise control of the vehicle.

I claim:
1. An automobile road vehicle having a driver/passenger compartment provided with a conventional glazed windshield and windows, and appropriate provision being made for the necessary openings, and within which compartment is provided resilient buffer means completely surrounding the occupants from feet to head, with the exception of the glazed areas, and padded seats, whereby in the event of a collision impact the occupants are protected by paddings from major injury independent of the direction in which they are thrown, said compartment being carried within a girdle fender forming a complete mechanical loop around the base of said compartment and said girdle fender being connected to said compartment through shock-absorbing means, the buffer means in front of the occupants in the direction of collision being shaped to allow the occupants' bodies to fold round said buffer means without touching said glazed areas, said compartment being divided into two parts respectively for front and rear occupants, and said padded seats being arranged back to back to give protection by said buffer means to the occupants irrespective of whether the collision direction is forwardly or rearwardly in regard to the direction of travel of the vehicle itself.

2. An automobile road vehicle having a driver/passenger compartment provided with a conventional glazed windshield and windows, and appropriate provision being made for the necessary openings, and within which compartment is provided resilient buffer means completely surrounding the occupants from feet to head, with the exception of the glazed areas, and padded seats, whereby in the event of a collision impact the occupants are protected by paddings from major injury independently of the direction in which they are thrown, said compartment being carried within a girdle fender forming a complete mechanical loop around the base of said compartment and said girdle fender being connected to said compartment through shock-absorbing means, the buffer means in front of the occupants having an upper part that projects towards the occupant, and is above the occupant's center of gravity, said buffer means being shaped to follow the profile of the seated occupants and spaced not more than twelve inches from such occupants.

References Cited

UNITED STATES PATENTS

| | | | |
|---|---|---|---|
| 846,599 | 3/1907 | Nicholson et al. | 293—30UX |
| 1,486,660 | 3/1924 | Hajdu | 293—62UX |
| 1,923,466 | 8/1933 | West | 296—63 |
| 2,760,813 | 8/1956 | Colm | 296—63X |
| 3,088,539 | 5/1963 | Mathues et al. | 280—150(B)X |
| 3,162,479 | 12/1964 | Hewitt | 296—35 |
| 3,367,709 | 2/1968 | Sung | 296—35 |

FOREIGN PATENTS

| | | | |
|---|---|---|---|
| 836,748 | 4/1952 | Germany | 280—150B |

LEO FRIAGLIA, Primary Examiner

M. L. SMITH, Assistant Examiner

U.S. Cl. X.R.

293—30, 63